United States Patent [19]

Blackford, Jr.

[11] Patent Number: 5,394,647
[45] Date of Patent: Mar. 7, 1995

[54] HYDROPONIC PLANT GROWING SYSTEM AND STRUCTURE

[76] Inventor: John W. Blackford, Jr., 2200 Warrington Rd., Santa Rosa, Calif. 95404

[21] Appl. No.: 199,531

[22] Filed: Feb. 22, 1994

[51] Int. Cl.6 .................................... A01G 31/00
[52] U.S. Cl. ........................................ 47/62; 47/59
[58] Field of Search ............................. 47/59, 62, 63

[56] References Cited

U.S. PATENT DOCUMENTS

| | | | |
|---|---|---|---|
| 2,855,725 | 10/1958 | Carothers | 47/62 |
| 3,352,057 | 11/1967 | Ferrand | 47/62 |
| 3,660,933 | 5/1972 | Wong, Jr. | 47/62 |
| 4,059,922 | 11/1977 | DiGiacinto | 47/59 |
| 4,310,990 | 1/1982 | Payne | 47/59 |
| 4,584,791 | 4/1986 | Wolf | 47/62 |
| 4,953,322 | 9/1990 | Edwards | |
| 4,965,962 | 10/1990 | Akagi | |
| 4,976,064 | 12/1990 | Julien | 47/63 |
| 4,986,027 | 1/1991 | Harvey | |
| 5,010,686 | 4/1991 | Rivest | 47/62 |
| 5,067,275 | 11/1991 | Constance | 47/62 |
| 5,097,627 | 3/1992 | Roberts | |
| 5,168,664 | 12/1992 | Deutschmann, Sr. | |
| 5,269,094 | 12/1993 | Wolverton et al. | 47/62 |

FOREIGN PATENT DOCUMENTS

| | | | |
|---|---|---|---|
| 0052264 | 5/1982 | European Pat. Off. | 47/62 |
| 5007426A | 1/1993 | Japan | 47/59 |
| 2050788 | 1/1981 | United Kingdom | 47/62 |

*Primary Examiner*—Ramon S. Britts
*Assistant Examiner*—Joanne C. Downs

[57] ABSTRACT

A new virtually self-contained hydroponic plant growing system has a horizontal tubular chamber capped at each end, the chamber having a series of holes along its top for supporting a plurality of specially constructed flower pots or cups having holes in their bottoms to enable root growth outside of the pot or cup to access the plant nutrients. The pots or cups can contain similar and/or different vegetables and other plants. A horizontal divider containing a series of small drip holes extends from end to end within the center of the tubular chamber. A water pump, which can be solar powered, circulates water and other nutrients from a reservoir system through a spray means inside the tubular chamber based on a timer set to deliver the water and other nutrients at optimal times to maximize growth.

7 Claims, 4 Drawing Sheets

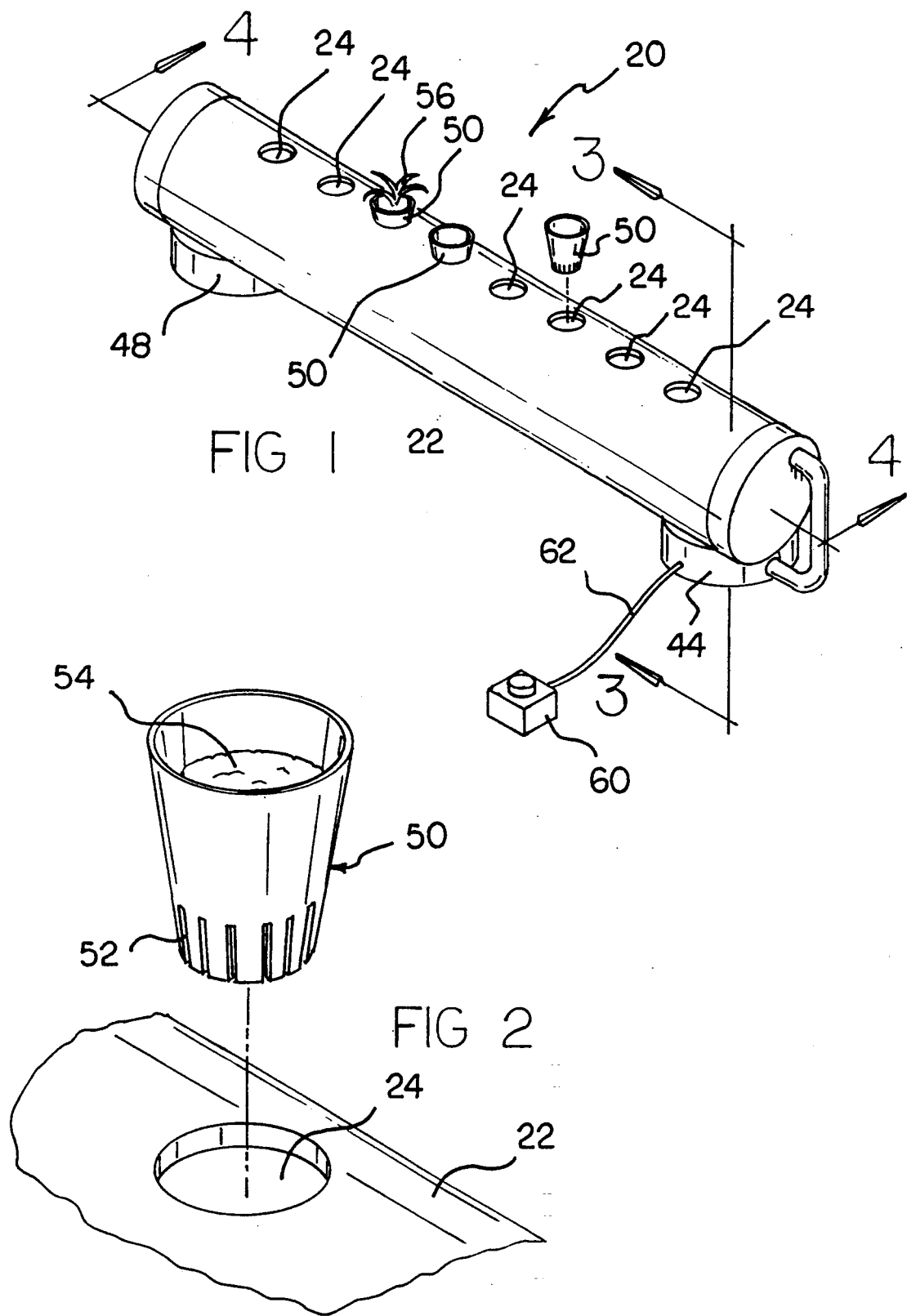

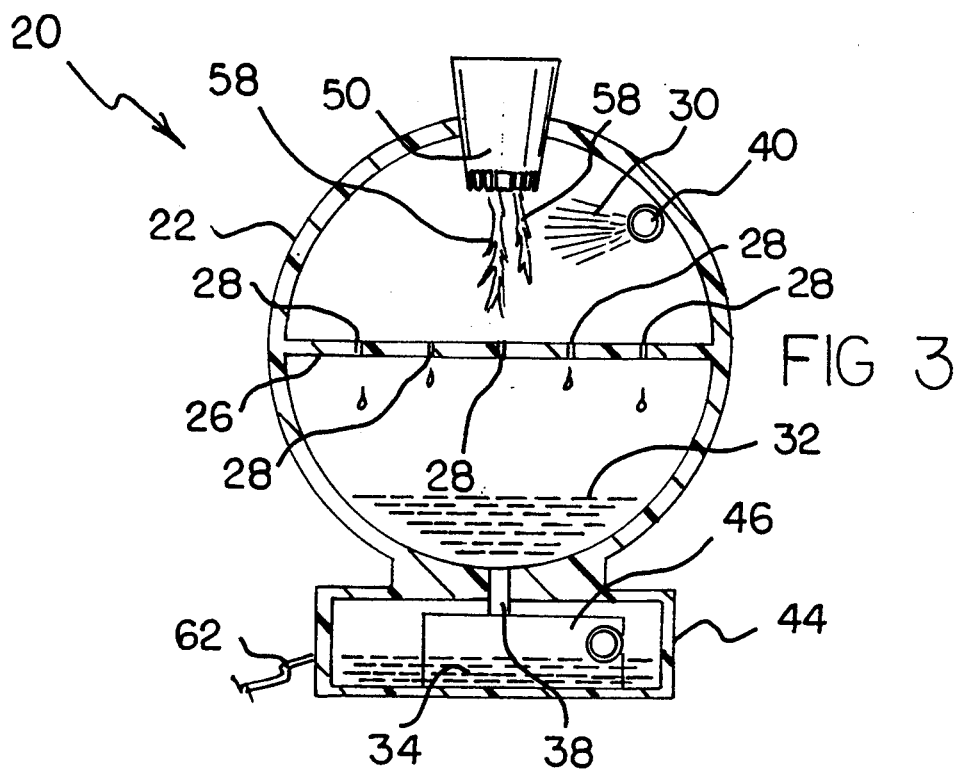
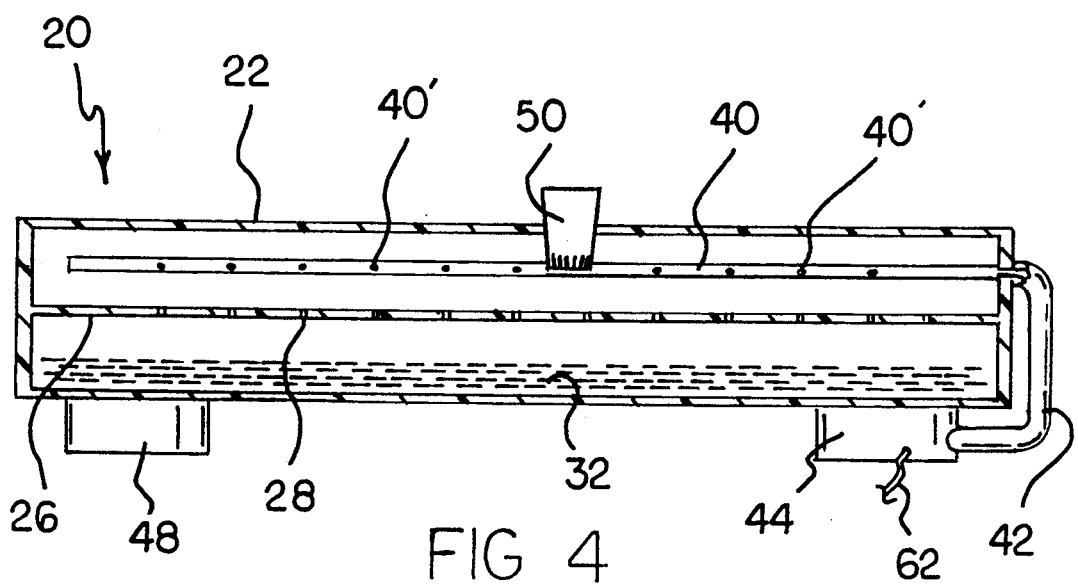

HYDROPONIC PLANT GROWING SYSTEM AND STRUCTURE

BACKGROUND OF THE INVENTION

1. Field of the Invention

The present invention relates generally to plant growing systems and structures, and more particularly, to a hydroponic plant growing system and structure especially adapted to effect optimal plant growth in a virtually self-contained structure.

2. Description of the Prior Art

Gardening is one of the most popular backyard activities among United State homeowners. It provides an individual with a positive form of pleasure and relaxation. Until now, apartment and condominium dwellers, as well as the handicapped and elderly, were denied the opportunity to experience the satisfaction that is inherent to planting, growing, and enjoying the harvest.

Plant growing systems in the form of flower pots which a person must water are, of course, well known. Automatic systems for watering plants are also well known. Recent technology has advanced the art of hydroponics, the growing of plants without soil. Some examples of recent prior art hydroponic plant growing systems are shown in the following U.S. Pat. Nos.: 4,965,962; 4,986,027; 5,097,627; and 4,953,322.

Thus, while the foregoing body of prior art indicates it to be well known to use hydroponic systems, the provision of a more simple and cost effective device is not contemplated. Nor does the prior art described above teach or suggest a hydroponic plant growing system and structure which is virtually self-contained, requiring only the occasional adding of water and/or other nutrients and which may be used by individuals to grow a plurality of similar or different vegetables and other plants at the same time indoors. The foregoing disadvantages are overcome by the unique hydroponic plant growing system and structure of the present invention as will be made apparent from the following description thereof. Other advantages of the present invention over the prior art also will be rendered evident.

SUMMARY OF THE INVENTION

To achieve the foregoing and other advantages, the present invention, briefly described, provides a new virtually self-contained hydroponic plant growing system having a horizontal tubular chamber capped at each end and having a series of holes along its top for supporting a plurality of specially constructed flower pots or cups having holes in their bottoms to enable root growth outside of the pot or cup to access the plant nutrients. The pots or cups can contain similar or different vegetables and/or other plants. A horizontal divider containing a series of small drip holes extends from end to end within the center of the tubular chamber. A water pump, which can be solar powered, circulates water and other nutrients from a reservoir system through a spray means inside the tubular chamber based on a timer set to deliver the water and other nutrients at optimal times to maximize growth.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will form the subject matter of the claims appended hereto.

In this respect, before explaining the preferred embodiments of the invention in detail, it is to be understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which this disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

Further, the purpose of the foregoing Abstract is to enable the U.S. Patent and Trademark Office and the public generally, and especially the scientists, engineers and practitioners in the art who are not familiar with patent or legal terms of phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

It is therefore an object of the present invention to provide a new hydroponic plant growing system which has all of the advantages of the prior art and none of the disadvantages.

It is another object of the present invention to provide a new hydroponic plant growing system which may be easily and efficiently manufactured and marketed.

It is a further objective of the present invention to provide a new hydroponic plant growing system which is of durable and reliable construction.

An even further object of the present invention is to provide a new hydroponic plant growing system which is susceptible of a low cost of manufacture with regard to both materials and labor, and which accordingly is then susceptible of low prices of sale to the consuming public, thereby making such hydroponic plant growing system available to the buying public.

Still yet a further object of the present invention is to provide a new virtually self-contained hydroponic plant growing system and structure having a horizontal tubular chamber capped at each end and having a series of holes along its top for supporting a plurality of specially constructed flower pots or cups having holes in their bottoms to enable root growth outside of the pot or cup to access the plant nutrients.

It is still a further object of the present invention to provide a new hydroponic plant growing system in which the pots or cups can contain similar or different vegetables and/or other plants at the same time such that a small diverse garden could be had using only the present invention on a window sill or the like.

Still a further object of the present invention is to provide a new hydroponic plant growing system including means, which can be solar powered, for circulating water and other nutrients to the roots of the plants from a reservoir system through a spray means inside the tubular chamber based on a timer set to deliver the water and other nutrients at optimal times to maximize growth.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as /bjects other than those set forth above will become more apparent after a study of the following detailed description thereof. Such description makes reference to the annexed drawings wherein:

FIG. 1 is a perspective view showing the first preferred embodiment of the hydroponic plant growing system of the invention.

FIG. 2 is a partial elevational view in detail of part of the hydroponic plant growing system of FIG. 1 in accordance with the present invention.

FIG. 3 is a cross-sectional end view of the hydroponic plant growing system along line 3—3 of FIG. 1 in accordance with the present invention.

FIG. 4 is a cross-sectional side view of the hydroponic plant growing system along line 4—4 of FIG. 1 in accordance with the present invention.

DESCRIPTION OF THE PREFERRED EMBODIMENT

Figure 5:
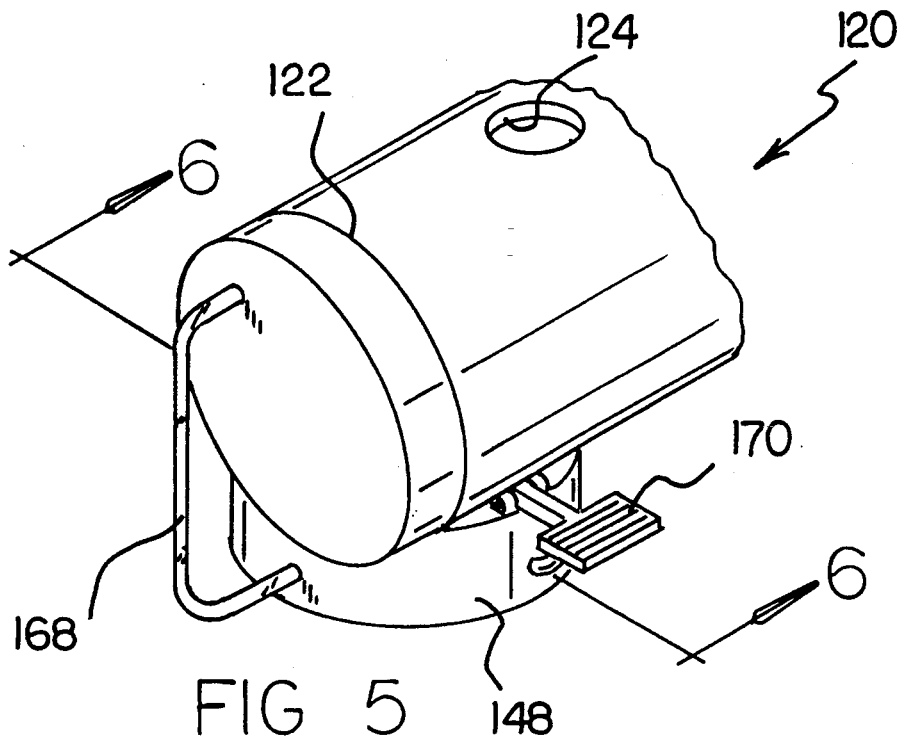
FIG. 5 is a perspective partial view in elevation of a second preferred embodiment of the present invention.

With reference now to the drawings, a new hydroponic plant growing system embodying the principles and concepts of the present invention will be described.

Turning initially to FIGS. 1-4, there is shown a first exemplary embodiment of the hydroponic plant growing system of the invention generally designated by reference numeral 20. In its preferred form, hydroponic plant growing system 20 comprises generally a normally horizontally positioned tubular chamber (or pipe) 22 capped at each end and having holes 24 for holding plant cups 50. A horizontal divider 26 (see FIGS. 3 and 4) containing a series of small drip holes 28 extends from end to end within the center of the tubular chamber 22.

Inside the tubular chamber 22 as substantially shown runs a longitudinally extending spray tube 40 having a plurality of spray holes 40' for spraying water and other nutrients 30, An outside tube 42 runs from a reservoir housing 44 to the spray tube 40 inside the chamber 22. A conventional pump 46 is used to circulate the water and other nutrients through the system, Water not absorbed by the roots of the plant falls onto the horizontal divider 26 and drips through the holes 28 to the bottom of chamber 22, The excess water and nutrients 32 in the chamber are then recycled through recycle channel 38 back into reservoir 44 (the water and nutrients in reservoir 44 are represented by reference numeral 34)by the action of pump 46.

Reservoir housing 44 also acts as one support leg for the device. Leg 48 supports the other side of the device. Alternatively, conduit 38 and reservoir 44 may be dispensed with and pump 46 placed directly inside the bottom or second section of chamber 22 and connected directly to outside tube 42 through the bottom half of the circular sidewall of the chamber. In this latter case, a pair of legs 48 may be used to support the chamber.

The plant cups 50 are specially constructed with slots 52 in their bottoms to allow the plant's roots to grow through beyond the cup bottom. The roots are watered by the spray in the top chamber, and the water then flows through the series of holes 28 in the center divider 26 to join the water and nutrients 32 sitting in the bottom of the chamber 22.

The plant cups 50 can contain a plant support medium 54 such as sand. FIG. 1 shows one cup containing a growing plant 56.

The pump 46 can be set to operate periodically to maximize plant growth. A conventional timer 60 having a cord 62 can be used suitably to operate the system.

The present invention can be run by either AC or DC power, and is preferably run by solar power such that the system will be virtually self-contained.

Use of the first embodiment of the present invention is very simple. Water and other nutrients are added to the system through one of the holes 24. Next plants or seeds are place in the cups 50. The same type of plant or various different types of plants can be placed in the different cups 50. The cups 50 are placed in the holes 24 and the timer 60 is set. The water is then circulated to water the plants periodically. A garden of assorted different vegetables could be planted in one device 20 and placed upon a window sill in a small apartment.

Figure 6:
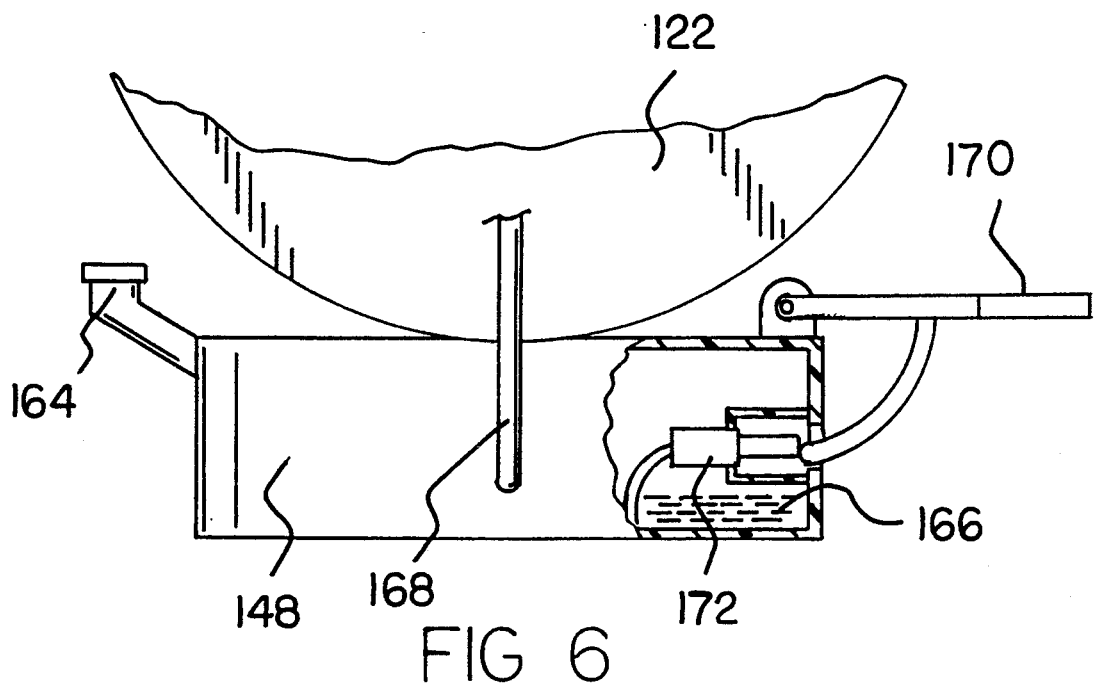
FIG. 6 is a partially cross-sectional side view of the second preferred embodiment of the present invention taken along 6—6 of FIG. 5.

A second embodiment hydroponic plant growing system 120 is shown in FIGS. 5 and 6. The second embodiment is very similar to the first embodiment with the addition of a separate addition means for supplying fertilizer of the like to the system. The second embodiment chamber 122 can be virtually identical to the first embodiment chamber 22. A tube 168 runs from a fertilizer storage compartment 148 containing fertilizer 166 to the chamber 122. Additional fertilizer 166 can be added to the storage compartment 148 through fill hole 164. Fertilizer 166 can be pumped from the storage compartment 148 through the tube 168 to the chamber 122 by means of pedal 170 operated mechanical pump 172.

Use of the second embodiment is the same as the first with the addition that if extra fertilizer is needed, it can be occasionally added to the chamber by pressing down on the pump pedal 170.

Figure 7:
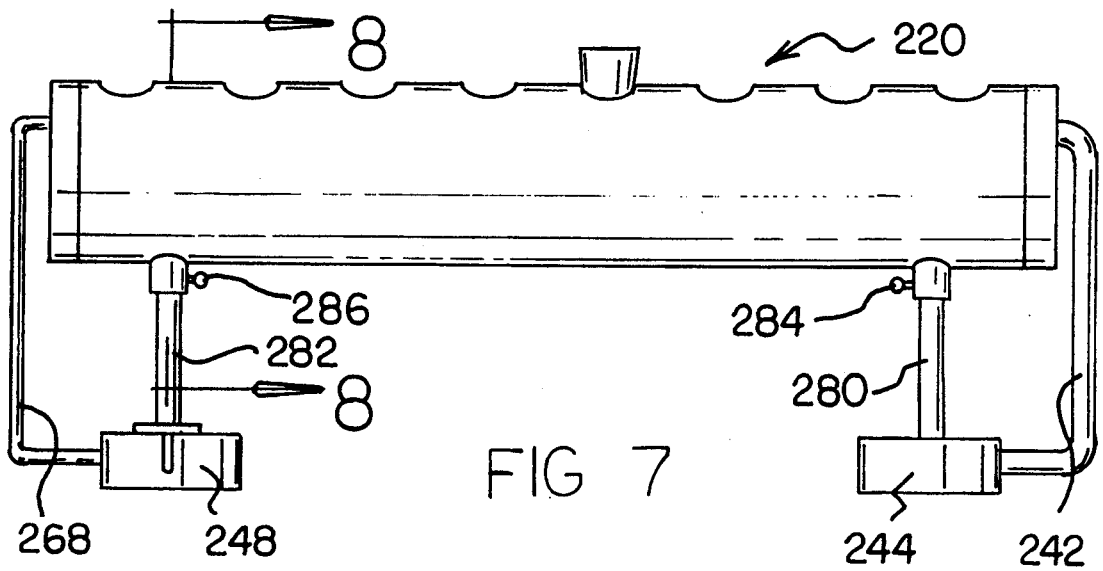
FIG. 7 is a perspective side view of a third preferred embodiment of the present invention.
Figure 8:
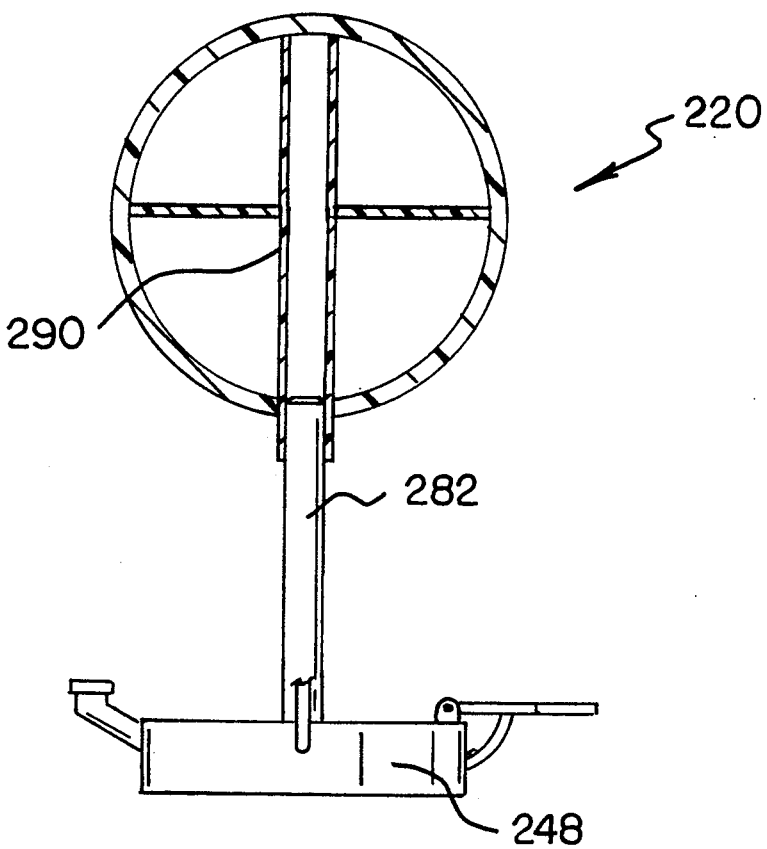
FIG. 8 is a partial cross-sectional end view of the second preferred embodiment of the invention taken along 8—8 of FIG. 7.

A third embodiment 240 is shown in FIGS. 7 and 8. The third embodiment is very similar to the second embodiment with the addition of extendable legs 280 and 282 which can be made longer or shorter depending upon the desire of the owner. Since the legs 280 and 282 are extendable, the tubes 242 and 268 must be made of a flexible material. The extendable leg 280 above reservoir 244 and the extendable leg above fertilizer compartment 248 each have tighteners (284 and 286 respectively).

A pair of slotted tubes (in FIG. 8 only slotted tube 290 is shown for leg 282) are used to allow the legs 280 and 282 to move up or down piston-like such that the legs 280 and 282 can be kept at various different lengths.

Use of the third embodiment is the same as the second with the addition of being able to have different length legs. The tighteners 284 and 286 are loosened and the legs 280 and 282 are moved to the desired lengths and then the tighteners 284 and 286 are retightened.

It is apparent from the above that the present invention accomplishes all of the objectives set forth by providing a new hydroponic plant growing system comprising: a tubular chamber having a plurality of holes along the top and a centrally positioned divider running along the inside length of the chamber; a plurality of plant cups each adapted to fit within one of the plurality of holes along the top of the tubular chamber, each of the cups having at least one in the bottom through which plant roots can grow; a reservoir means for holding the water and other nutrients; and a pump means for circulating the water and other nutrients. The chamber can be positioned for use horizontally. The invention can further comprise a timer for regulated the period between the use of the pump; whereby the growth of the plants can be optimized. The invention can further comprise a separate means for adding fertilizer to the system. The height of said device can be adjusted. The invention can have first and second length adjustable legs.

The present invention is conveniently portable and self-contained and is particularly useful as a sealed hydroponic vegetable growing unit. The divided pipe chamber construction allows plants on top to be watered with excess water draining to the lower level for storage. The automatic timer can be set to turn the pump on, for example every 45 minutes, to refill the top half of the tube to the level of the cups, which have openings in them allowing the sand media to get wet watering the plants. Eventually roots go through the cup into the chamber. The device could be, for example, 12 V powered with a 12 V battery which could be powered by solar energy. The tubular chamber could be 4–8 feet or longer for larger production and could grow vegetables indoors by using indoor grow lights or by placing the unit by a sunny window. Virtually any apartment with a small deck could grow their own vegetables. Using the present invention, very little if any water is wasted and no chemicals or pesticides are necessary. Organic nutrients could be used.

While the invention is shown using a horizontal tubular chamber, a vertical tubular chamber could alternatively be used. Window models, floor models, mobile models, are all possible.

Virtually anyone can use the present invention regardless of physical abilities. The vegetable hydro can be produced in various shapes and sizes to fit the needs of the user. The entire assembly can be constructed to nest within one of a variety of stands which will position the device at different heights. Floor models, window models, and models which can be displayed on a porch railing are all possible. The device can be made in virtually any color using dyes.

A wide variety of popular vegetables and flowers are among the plants suitable for use with the device. They can be started from seed or transplants. There is no problem with weeds competing with the plants being grown, and soil inhabiting diseases and pests are also avoided.

The device is preferably constructed of PVC material.

With respect to the above description, it should be realized that the optimum dimensional relationships for the parts of the invention, to include variations in size, materials, shape, form, function and manner of operation, assembly and use, are deemed readily apparent and obvious to those skilled in the art, and therefore, all relationships equivalent to those illustrated in the drawings and described in the specification are intended to be encompassed only by the scope of appended claims.

While the present invention has been shown in the drawings and fully described above with particularity and detail in connection with what is presently deemed to be the most practical and preferred embodiments of the invention, it will be apparent to those of ordinary skill in the art that many modifications thereof may be made without departing from the principles and concepts set forth herein. Hence, the proper scope of the present invention should be determined only by the broadest interpretation of the appended claims so as encompass all such modifications and equivalents.

What is claimed as being new and desired to be protected by Letters Patent of the United States is as follows:

1. A new hydroponic plant growing system comprising:
   a tubular chamber having a plurality of holes along an exterior portion thereof, said chamber having a divider running along the interior extent of said chamber to divide said chamber interior into first and second sections, said divider having one or more holes therein for permitting flow of water and other nutrients between said first section and said second section;
   a plurality of plant cups each adapted to fit within one of said plurality of holes along said chamber exterior portion, each of said cups having a bottom extending into said first chamber section, each of said cups further having at least one hole in the bottom thereof through which plant roots can grow in the space defined by said first section;
   dispensing means in said first section for irrigating said plant roots growing in said first section,
   reservoir means associated with said second section for holding water and other nutrients;
   a pump means connected between said dispensing means and said reservoir means for circulating the water and other nutrients through said dispensing means and said first section;
   a timer for regulating the period between the use of said pump whereby the growth of the plants can be optimized; and,
   means for adjusting a height of said chamber.

2. The invention of claim 1 wherein said chamber is positioned for use horizontally.

3. The invention of claim 1, and further comprising a separate means for adding fertilizer to said system.

4. The invention of claim 1, wherein said means for adjusting comprises first and second length adjustable legs.

5. The invention of claim 1 wherein said reservoir is mounted below said second section of said chamber and connected thereto by a first conduit, said reservoir being connected to said first section of said chamber by a second conduit.

6. A hydroponic plant growing system comprising:

a tubular chamber having a plurality of holes along an exterior portion thereof, said chamber having a divider running along the interior extent of said chamber to divide said chamber interior into first and second sections, said divider having at least one hole directed therethrough for permitting flow of water and other nutrients between said first section and said second section;

a plurality of plant cups each adapted to fit within an individual one of said plurality of holes along said chamber exterior portion, each of said cups having a bottom extending into said first chamber section and being spaced from said divider a suffficient distance to permit plant roots to extend therebetween, each of said cups further having at least one hole in the bottom thereof through which plant roots can grow in the space defined by said first section;

dispensing means in said first section for irrigating said plant roots growing in said first section, said dispensing means comprising a spray tube positioned within said first section and extending along a longitudinal length thereof, said spray tube being positioned laterally of said plant cups so as to spray said water and other nutrients /nto said plant roots located exteriorly of said plant cups and within said first section, wherein said roots hang exposed and unimmersed within said first section to receive said spray of water and other nutrients;

reservoir means associated with said second section for holding water and other nutrients; and, a pump means connected between said dispensing means and said reservoir means for circulating said water and other nutrients through said dispensing means and said first section, whereby the water in said reservoir means is never permitted to enter said first section by means of said at least one hole in said divider.

7. The hydroponic plant growing system of claim 6, wherein said reservoir means comprises a reservoir positioned beneath said tubular chamber and in fluid communication with said second section such that said water and other nutrients within said second section are gravitationally biased into said reservoir, with said pump means being located within said reservoir.

* * * * *